(12) United States Patent
Hammerum et al.

(10) Patent No.: US 9,709,033 B2
(45) Date of Patent: Jul. 18, 2017

(54) METHOD FOR CONTROLLING A WIND TURBINE DURING SHUTDOWN

(71) Applicant: Vestas Wind Systems A/S, Aarhus N (DK)

(72) Inventors: Keld Hammerum, Hadsten (DK); Thomas Krüger, Tilst (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 314 days.

(21) Appl. No.: 14/395,849

(22) PCT Filed: Apr. 22, 2013

(86) PCT No.: PCT/DK2013/050117
§ 371 (c)(1),
(2) Date: Oct. 21, 2014

(87) PCT Pub. No.: WO2013/159779
PCT Pub. Date: Oct. 31, 2013

(65) Prior Publication Data
US 2015/0086360 A1 Mar. 26, 2015

Related U.S. Application Data

(60) Provisional application No. 61/637,863, filed on Apr. 25, 2012.

(30) Foreign Application Priority Data

Apr. 23, 2012 (DK) .................................. 2012 70205

(51) Int. Cl.
*F03D 7/02* (2006.01)
(52) U.S. Cl.
CPC ......... *F03D 7/0224* (2013.01); *F03D 7/0264* (2013.01); *Y02E 10/723* (2013.01)

(58) Field of Classification Search
CPC ..... F03D 7/0224; F03D 7/0264; Y02E 10/723
See application file for complete search history.

(56) References Cited

U.S. PATENT DOCUMENTS 4,462,753 A * 7/1984 Harner .................. F03D 7/0224
416/158
4,503,673 A * 3/1985 Schachle .................. F03D 7/04
290/44

(Continued)

FOREIGN PATENT DOCUMENTS

EP  2067988 A2  6/2009
EP  2290232 A1  3/2011

OTHER PUBLICATIONS

International Search Report for PCT/DK2013/050117, Jul. 25, 2013.
Danish Search Report for PA 2012 70205, Dec. 6, 2012.

*Primary Examiner* — Igor Kershteyn
(74) *Attorney, Agent, or Firm* — Patterson + Sheridan, LLP (57) ABSTRACT

A method for controlling an individually pitched wind turbine during shutdown is disclosed, the wind turbine comprising at least three wind turbine blades (1a, 1b, 1c). In response to a shutdown command for stopping operation of the wind turbine, a blade parameter of each of the wind turbine blades (1a, 1b, 1c), e.g. pitch angle, bending moment or blade acceleration, is determined. The blade parameters of the wind turbine blades (1a, 1b, 1c) are compared, and a shutdown strategy for the wind turbine is selected from a group of two or more predefined shutdown strategies, based on the comparing step. Finally, the wind turbine blades (1a, 1b, 1c) are moved towards a feathered position in accordance with the selected shutdown strategy.

18 Claims, 5 Drawing Sheets

(56) References Cited

U.S. PATENT DOCUMENTS

| | | | | |
|---|---|---|---|---|
| 5,584,655 | A * | 12/1996 | Deering | F03D 7/0224 290/44 |
| 6,137,187 | A * | 10/2000 | Mikhail | F03D 7/0224 290/44 |
| 6,327,957 | B1 * | 12/2001 | Carter, Sr. | B63J 3/04 416/159 |
| 7,118,339 | B2 * | 10/2006 | Moroz | F03D 1/008 415/4.3 |
| 2004/0094964 | A1 * | 5/2004 | Mikhail | F03D 7/0224 290/44 |
| 2007/0116572 | A1 * | 5/2007 | Barbu | F03D 7/0224 416/132 B |
| 2009/0148286 | A1 | 6/2009 | Kammer et al. | |
| 2009/0246019 | A1 * | 10/2009 | Volanthen | F03D 17/00 416/1 |
| 2010/0303622 | A1 | 12/2010 | Machold | |
| 2011/0040413 | A1 | 2/2011 | Jeppesen et al. | |
| 2011/0142630 | A1 * | 6/2011 | Hayashi | F03D 7/0224 416/34 |
| 2011/0193343 | A1 | 8/2011 | Nakashima et al. | |
| 2012/0093645 | A1 | 4/2012 | Haag | |

* cited by examiner

METHOD FOR CONTROLLING A WIND TURBINE DURING SHUTDOWN

FIELD OF THE INVENTION

The present invention relates to a method for controlling an individually pitched wind turbine during shutdown. More particularly, the method of the invention reduces loads on the wind turbine blades during the shutdown. The invention further relates to a control unit adapted to perform the method, and to a wind turbine comprising such a control unit.

BACKGROUND OF THE INVENTION

In pitch controlled wind turbines, the pitch of the wind turbine blades is adjusted in response to the wind conditions, and in order to obtain a desired energy production. As the wind turbine blades rotate during operation, the loads on each wind turbine blade changes, e.g. due to wind shear, tower passage, turbulence, etc. This may cause asymmetric load distribution among the wind turbine blades. This is undesirable, since it leads to high loads on the rotor, the drive train, etc. In order to avoid this, an individual pitch control strategy is sometimes used. According to an individual pitch control strategy, the pitch angles of the individual blades are adjusted in order to take conditions at the position of each blade into account.

When a halt command or shutdown command is generated for a pitch controlled wind turbine, e.g. due to an emergency situation, the wind turbine blades are normally moved to a feathered position, i.e. their pitch angles are changed until the wind turbine blades are in a position where they no longer catch the wind. It is often desirable to move the wind turbine blades as quickly as possible to the feathered position.

However, in the case of individually pitched wind turbines, the pitch angles of the wind turbine blades are not identical when the halt command or shutdown command is received. On the contrary, the pitch angle of each wind turbine blade has been adjusted in such a manner that it takes the conditions prevailing at the exact position of the blade in question into account. If all the wind turbine blades are simply moved as quickly as possible towards the feathered position when the halt command or shutdown command is received, the mutual differences in the pitch angles will remain as the wind turbine blades continue rotation in the rotor plane, while moving towards the feathered position. Thereby the wind turbine blades are moved away from the positions which dictated the adjustments in the pitch angles, but the adjustments are not altered. This may lead to asymmetric loads on the wind turbine blades which are even worse than would be the case if the pitch angles of the wind turbine blades were simply identical. It is therefore desirable to provide a control strategy during shutdown of an individually pitched wind turbine, which reduces the asymmetric load on the wind turbine blades.

EP 2 290 232 discloses a wind turbine pitch angle control device configured to carry out individual pitch control. When a wind turbine halt command is input, the pitch angles of the wind turbine blades are matched, and then the pitch angles are moved to a feathered position. When the wind turbine halt command is input, a representative wind turbine blade may be identified on the basis of the pitch angle from among the plurality of wind turbine blades. The pitch angle of the representative wind turbine blade and the pitch angles of the other wind turbine blades are then matched, and then the pitch angles of the wind turbine blades are moved to the feathered position. The representative wind turbine blade may be the wind turbine blade whose pitch angle is closest to the feathered position.

The control device of EP 2 290 232 reduces the asymmetric loads on the wind turbine blades during shutdown, because the pitch angles are aligned before the wind turbine blades are moved to the feathered position. However, the shutdown process is delayed because the aligning must take place before the movement towards the feathered position is commenced. Furthermore, the same shutdown strategy is used each time a halt command is input, even though this shutdown strategy may not be appropriate in all situations.

DESCRIPTION OF THE INVENTION

It is an object of embodiments of the invention to provide a method for controlling an individually pitched wind turbine during shutdown, wherein asymmetric loads on the wind turbine blades are minimised, while the time from shutdown command until shutdown is completed is minimised.

It is a further object of embodiments of the invention to provide a method for controlling an individually pitched wind turbine during shutdown, wherein an optimal shutdown strategy under the given circumstances can be selected.

According to a first aspect the invention provides a method for controlling an individually pitched wind turbine during shutdown, said wind turbine comprising at least three wind turbine blades, the method comprising the steps of:
  receiving a shutdown command for stopping operation of the wind turbine,
  determining a blade parameter of each of the wind turbine blades,
  comparing the blade parameters of the wind turbine blades,
  selecting a shutdown strategy for the wind turbine from a group of two or more predefined shutdown strategies, based on the comparing step, and
  moving the wind turbine blades towards a feathered position in accordance with the selected shutdown strategy.

In the present context the term 'individually pitched wind turbine' should be interpreted to mean a wind turbine in which the pitch angle of each of the wind turbine blades is adjusted individually in order to take the conditions prevailing at the exact position of each wind turbine blade into account, in order to reduce the asymmetric loads on the wind turbine blades, as described above.

According to the method of the invention, a shutdown command is initially received. The shutdown command indicates that operation of the wind turbine is to be stopped. The shutdown command may, e.g., be generated in response to a detected emergency situation, such as failure or malfunction of a component of the wind turbine, a temperature measured in the wind turbine being out of range, or any other suitable situation which requires that operation of the wind turbine is discontinued. Alternatively or additionally, the shutdown command may be generated in response to measured environmental conditions, such as wind speed, humidity, air density, etc. being outside the operating range of the wind turbine. In any event, when a shutdown command is received, it is normally desirable to stop operation of the wind turbine as fast as possible.

When the shutdown command has been received, a blade parameter of each of the wind turbine blades is determined.

In the present context the term 'blade parameter' should be interpreted to mean a parameter, e.g. a measurable parameter, which is indicative of a condition of the blade. The blade parameter may, e.g., be a pitch angle, a bending moment of the blade, blade acceleration, etc. The blade parameter may advantageously be a parameter which is indicative of mechanical loads on the wind turbine blade, and/or which reflects differences in mechanical loads on the blades.

It should be noted that the step of determining a blade parameter of each of the wind turbine blades does not necessarily include determining an absolute value of the blade parameter of each wind turbine blade. Instead, relative values may be determined, e.g. in such a manner that the value of each wind turbine blade relative to a reference point, or relative to the parameters of the other wind turbine blades is determined. Simply obtaining a measure for the blade parameter of each of the wind turbine blades relative to the other wind turbine blades will, in some cases, provide sufficient information regarding asymmetric loads on the wind turbine rotor, and in such cases there is no need to obtain the absolute values of the blade parameters.

The blade parameters may be measured. As an alternative, they may be inherently known to the control system. This is, e.g., the case if the blade parameter is a pitch angle, since the pitch angle is calculated by the control system, and then the blade is rotated to the calculated pitch angle.

The blade parameters of the wind turbine blades obtained in this manner are then compared. In the case that the step of determining the blade parameters of the wind turbine blades comprises obtaining relative values of the blade parameters, the step of comparing the blade parameters may form part of the step of determining the blade parameters. Based on this comparing step, a shutdown strategy for the wind turbine is selected. The shutdown strategy is selected from a group of two or more predefined shutdown strategies. Accordingly, a shutdown strategy which is appropriate under the given circumstances can always be selected, based on the comparison of the blade parameters.

In the case that the blade parameter is indicative of mechanical load on the blade, and/or reflects differences in mechanical loads on the blades, the comparison of the blade parameters of the blades reveals differences in mechanical loads among the blades, i.e. it reveals asymmetric loads on the blades. Thereby a shutdown strategy is selected based on asymmetric loads, or expected asymmetric loads, of the blades. Thus, a shutdown strategy which reduces or eliminates such asymmetric loads can be selected.

Finally, the wind turbine blades are moved towards a feathered position in accordance with the selected shutdown strategy.

In the present context the term 'moving the wind turbine blades towards a feathered position' should be interpreted to mean changing the pitch angles of the wind turbine blades in such a manner that the pitch angles become closer to the feathered position. Thus, the movement is a rotational movement about a longitudinal axis of the wind turbine blade.

As mentioned above, the blade parameters may be pitch angles of the wind turbine blades. Since the wind turbine is individually pitched, the pitch angles of the three or more wind turbine blades will differ from each other. According to this embodiment, the individual pitch angles of the wind turbine blades are compared during the comparing step, and the shutdown strategy is selected on the basis of differences in the pitch angles.

Alternatively, the blade parameters may be other suitable parameters being indicative of a condition of the blades, e.g. reflecting mechanical loads on the blades, including, but not limited to blade bending moments, blade acceleration, etc.

In the case that the blade parameters are pitch angles of the wind turbine blades, the step of comparing the pitch angles may comprise identifying a first wind turbine blade, a second wind turbine blade and a third wind turbine blade, wherein the first wind turbine blade is the wind turbine blade having a pitch angle which is furthest away from a feathered position, the third wind turbine blade is the wind turbine blade having a pitch angle which is closest to a feathered position, and the second wind turbine blade has an intermediate pitch angle.

According to this embodiment, the comparison step reveals how close the pitch angles of each of the wind turbine blades is to the feathered position, as well as which wind turbine blade is closest to the feathered position, and which wind turbine blade is furthest away from the feathered position. Thus, in this case, a shutdown strategy is selected which takes the mutual positions of the wind turbine blades, relative to the feathered position, into account.

The step of comparing the pitch angles may further comprise the step of comparing the pitch angle, $\theta_2$, of the second wind turbine blade with an average of the pitch angle, $\theta_1$, of the first wind turbine blade and the pitch angle, $\theta_3$, of the third wind turbine blade, and wherein the step of selecting a shutdown strategy comprises selecting a first shutdown strategy in the case that $\theta_2$ is larger than the average of $\theta_1$ and $\theta_3$, and selecting a second shutdown strategy in the case that $\theta_2$ is smaller than or equal to the average of $\theta_1$ and $\theta_3$.

According to this embodiment, the intermediate pitch angle, $\theta_2$, is compared to the average of the largest pitch angle and the smallest pitch angle, $(\theta_1+\theta_3)/2$. If the intermediate pitch angle is larger than this average, i.e. if $\theta_2>(\theta_1+\theta_3)/2$, a first shutdown strategy is selected. In this case the intermediate pitch angle is closer to the largest pitch angle than to the smallest pitch angle, and the selected shutdown strategy takes this into account.

On the other hand, if the intermediate pitch angle is smaller than or equal to the average, i.e. if $\theta_2 \leq (\theta_1+\theta_3)/2$, a second shutdown strategy is selected. In this case the intermediate pitch angle is closer to the smallest pitch angle than to the largest pitch angle, and the selected shutdown strategy takes this into account.

It should be noted that in the present context it is assumed that the pitch angle of a wind turbine blade is increased when the pitch angle is changed from an operating position to a feathered position. Thus, in the present context the wind turbine blade having the pitch angle which is closest to the feathered position has the largest pitch angle, and the wind turbine blade having the pitch angle which is furthest away from the feathered position has the smallest pitch angle.

The first shutdown strategy may comprise moving the second wind turbine blade and the third wind turbine blade at a first speed, $k_1$, and moving the first wind turbine blade at a second speed, $k_2$, wherein $k_1<k_2$. In the present context the term 'speed' should be interpreted to mean a pitch rate of the wind turbine blade. As mentioned above, the first shutdown strategy is selected when the intermediate pitch angle is closer to the largest pitch angle than to the smallest pitch angle. In this case, a shutdown strategy is selected, in which the wind turbine blade having the pitch angle which is closest to the feathered position as well as the wind turbine blade having the intermediate pitch angle are moved towards the feathered position at a low speed, while the wind turbine blade having the pitch angle which is furthest away from the feathered position is moved towards the feathered position at a higher speed. Thereby the wind turbine blade having the pitch angle which is furthest away from the feathered position is allowed to 'catch up' with the other wind turbine blades. Simultaneously, the other wind turbine blades are moved towards the feathered position. Thereby it is ensured that any asymmetry in the mechanical load on the wind turbine blades is reduced as quickly as possible, without delaying the process of moving the wind turbine blades to the feathered position.

Alternatively or additionally, the second shutdown strategy may comprise moving the third wind turbine blade at a first speed, $k_1$, and moving the first wind turbine blade and the second wind turbine blade at a second speed, $k_2$, wherein $k_1<k_2$. As described above, the second shutdown strategy is selected when the intermediate pitch angle is closer to the smallest pitch angle than the largest pitch angle. In this case a shutdown strategy is selected, in which the wind turbine blade having the pitch angle which is closest to the feathered position is moved towards the feathered position at a low speed, while the wind turbine blade having the pitch angle which is furthest away from the feathered position as well as the wind turbine blade having the intermediate pitch angle are moved towards the feathered position at a higher speed. Thereby the latter two wind turbine blades are allowed to 'catch up' with the wind turbine blade, which is closest to the feathered position. Simultaneously, this wind turbine blade is moved towards the feathered position. Thereby any asymmetry in the mechanical loads on the wind turbine blades is reduced as quickly as possible, without delaying the process of moving the wind turbine blades to the feathered position.

The method may further comprise the steps of:
monitoring the pitch angles of the wind turbine blades during shutdown, and
switching from the first shutdown strategy to the second shutdown strategy in the case that $\theta_2$ becomes smaller than or equal to the average of $\theta_1$ and $\theta_3$.

According to this embodiment, in the case that the first shutdown strategy was initially selected, the pitch angles of the wind turbine blades are monitored, and as soon as the criteria for selecting the second shutdown strategy are present, a switch from the first shutdown strategy to the second shutdown strategy is performed. In the case that the first and second shutdown strategies are the shutdown strategies described above, this means that the wind turbine blade having the pitch angle which is closest to the feathered position is moved at the low speed during the entire shutdown process, and the wind turbine blade having the pitch angle which is furthest away from the feathered position is moved at the high speed during the entire shutdown process, or at least until it has reached the pitch angle of the wind turbine blade having the pitch angle which is closest to the feathered position. However, the wind turbine blade having the intermediate pitch angle is initially moved at the low speed, and subsequently, when the wind turbine blade having the pitch angle which is furthest away from the feathered position has been moved sufficiently close to the wind turbine blade having the intermediate pitch angle, the wind turbine blade having the intermediate pitch angle is moved at the high speed for the remaining part of the shutdown process, or at least until it has reached the pitch angle of the wind turbine blade having the pitch angle which is closest to the feathered position. Such a shutdown process even further reduces the asymmetry in the mechanical loads on the wind turbine blades.

The method may further comprise the step of switching from the second shutdown strategy back to the first shutdown strategy in the case that $\theta_2$ exceeds the average of $\theta_1$ and $\theta_3$ by a predefined amount, or in the case that $\theta_2$ becomes larger than the average of $\theta_1$ and $\theta_3$, and a predetermined time has elapsed since the switch from the first shutdown strategy to the second shutdown strategy was performed.

According to this embodiment, a switch from the second shutdown strategy back to the first shutdown strategy is performed if the conditions change. If $\theta_2$ exceeds the average of $\theta_1$ and $\theta_3$, the criteria for selecting the first shutdown strategy are once again present, and it will therefore be suitable to switch back to the first shutdown strategy. However, in order to the ensure that $\theta_2$ has actually exceeded the average of $\theta_1$ and $\theta_3$, and that the detection of this condition is not a result of an erroneous measurement, a fluctuation, etc., the switch is not made until $\theta_2$ has exceeded the average of $\theta_1$ and $\theta_3$ by a predefined amount, or until a certain time has elapsed since the switch from the first shutdown strategy to the second shutdown strategy. Thereby it is prevented that repeated and rapid switches between the first and the second shutdown strategies are performed.

Alternatively or additionally, the method may further comprise the steps of:
monitoring the pitch angles of the wind turbine blades during shutdown, and
switching from the second shutdown strategy to the first shutdown strategy in the case that $\theta_3$ becomes larger than or equal to $\theta_2$.

According to this embodiment, the second shutdown strategy was initially selected, or a switch from the first shutdown strategy to the second shutdown strategy was performed during the shutdown process in the manner described above. In the case that the shutdown strategies are the shutdown strategies described above, this means that the wind turbine blade having the pitch angle which is furthest away from the feathered position, as well as the wind turbine blade having the intermediate pitch angle are moved at a higher speed than the wind turbine blade having the pitch angle which is closest to the feathered position. Thereby the pitch angles of these two blades approach the pitch angle of the wind turbine blade having the pitch angle which is closest to the feathered position. When the pitch angle of the wind turbine blade having the intermediate pitch angle reaches the pitch angle of the wind turbine blade having the pitch angle which is closest to the feathered position, the wind turbine blade having the intermediate pitch angle is moved at the low speed, along with the wind turbine blade having the pitch angle which is closest to the feathered position, for the remaining part of the shutdown process. The wind turbine blade having the pitch angle which is furthest away from the feathered position is still moved at the high speed, i.e. it continues to approach the other two wind turbine blades. When the pitch angle of the last wind turbine blade reaches the pitch angle of the other two wind turbine blades, the last wind turbine blade is also moved at the low speed for the remaining part of the shutdown process.

As an alternative, the method may further comprise the steps of:
monitoring the pitch angles of the wind turbine blades during shutdown, and
switching from the first shutdown strategy to the second shutdown strategy in the case that $\theta_1$ becomes equal to $\theta_2$.

According to this embodiment, in the case that the first shutdown strategy was initially selected, the pitch angles of the wind turbine blades are monitored. When the first wind turbine blade 'catches up' with the second wind turbine blade, i.e. when $\theta_1$ becomes equal to $\theta_2$, a switch to the second shutdown strategy is performed. In the case that the first and second shutdown strategies are the shutdown strategies described above, this means that the wind turbine blade having the pitch angle which is closest to the feathered position is moved at the low speed during the entire shutdown process, and the wind turbine blade having the pitch angle which is furthest away from the feathered position is moved at the high speed during the entire shutdown process, or at least until it has reached the pitch angle of the wind turbine blade having the pitch angle which is closest to the feathered position. The wind turbine blade having the intermediate pitch angle is initially moved at the low speed. When the wind turbine blade having the pitch angle which is furthest away from the feathered position reaches the pitch angle of the wind turbine blade having the intermediate pitch angle, the speed of the wind turbine blade is increased to the high speed, and the wind turbine blade having the intermediate pitch angle is moved at the high speed, along with the wind turbine blade having the pitch angle which is furthest away from the feathered position. Such a shutdown process also significantly reduces the asymmetry in the mechanical loads on the wind turbine blade.

The method may further comprise the steps of:
monitoring the blade parameters of the wind turbine blades during shutdown,
selecting a new shutdown strategy from the group of two or more shutdown strategies in the case that one or more predefined criteria is/are fulfilled, and
continuing movement of the wind turbine blades towards the feathered position in accordance with the new shutdown strategy.

This could, e.g., be performed in the manner described above. As an alternative, the selected shutdown strategies may differ from the shutdown strategies described above and/or the monitored blade parameters may not be pitch angles, but may instead be another suitable kind of blade parameters, such as blade bending moment, blade acceleration, etc.

The one or more criteria may comprise the blade parameter of one of the wind turbine blades becoming equal to the blade parameter of one of the other wind turbine blades, i.e. one of the wind turbine blades 'catches up' with one of the other wind turbine blades during the shutdown process. When this happens, the asymmetry of the blade parameters will likely have changed as compared to the initial situation at the time when the shutdown strategy was selected. Therefore, in this case, it may be appropriate to reconsider the selected shutdown strategy, and possibly select another shutdown strategy which is suitable under the new circumstances.

The step of selecting a shutdown strategy may comprise selecting the shutdown strategy which results in the lowest asymmetry of blade loads on the wind turbine blades while moving the wind turbine blades towards the feathered position.

According to a second aspect the invention provides a control unit for controlling pitch angles of an individually pitched wind turbine, the wind turbine comprising at least three wind turbine blades, the control unit being capable of performing the method according to the first aspect of the invention. The invention further relates to an individually pitched wind turbine comprising at least three wind turbine blades and a control unit according to the second aspect of the invention.

BRIEF DESCRIPTION OF THE DRAWINGS

The invention will now be described in further detail with reference to the accompanying drawings in which.

DETAILED DESCRIPTION OF THE DRAWINGS

Figure 1:
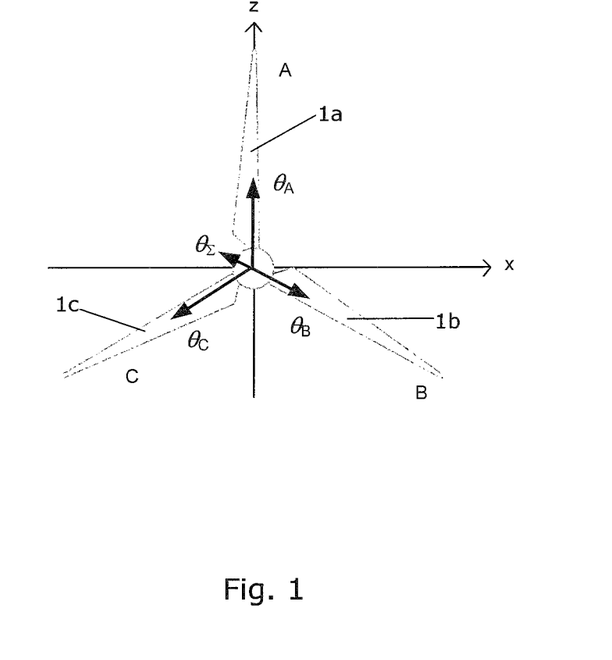
FIG. 1 illustrates pitch asymmetry of a wind turbine.

FIG. 1 shows three wind turbine blades 1a, 1b and 1c, arranged in a rotating coordinate system, in which the wind turbine blade 1a always coincides with the z axis. For each wind turbine blade 1a, 1b, 1c, the corresponding pitch angle is represented by a vector, $\theta_A$, $\theta_B$, and $\theta_C$. The vectors point in the same direction as the corresponding wind turbine blade 1a, 1b, 1c, and the magnitudes of the vectors equal the pitch angles, i.e. $|\theta_x|=\theta_x$. An aggregate pitch vector, $\theta_\Sigma = \theta_A + \theta_B + \theta_C$, is shown.

It can be shown that the squared magnitude of the aggregate vector is given by:

$$|\theta_\Sigma|^2 = \theta_A^2 + \theta_B^2 + \theta_C^2 - \theta_A\theta_B - \theta_A\theta_C - \theta_B\theta_C$$

The aggregate vector represents a pitch asymmetry in the sense that its magnitude is equal to zero if all pitch angles are equal.

Next, consider the time derivative of the squared magnitude:

$$\frac{d}{dt}|\theta_\Sigma|^2 = 2\theta_A\dot\theta_A + 2\theta_B\dot\theta_B + 2\theta_C\dot\theta_C - \dot\theta_A\theta_B - \theta_A\dot\theta_B - \dot\theta_A\theta_C - \theta_A\dot\theta_C - \dot\theta_B\theta_C - \theta_B\dot\theta_C$$

Since this expression is symmetric in the sense that the wind turbine blades 1a, 1b, 1c can be renamed without affecting the result, the wind turbine blades are renamed in the following in such a manner that $\theta_1$ is the lowest pitch angle, i.e. the pitch angle being furthest away from the feathered position, $\theta_2$ is the intermediate pitch angle, and $\theta_3$ is the largest pitch angle, i.e. the pitch angle being closest to the feathered position. Thus, $\theta_3 \geq \theta_2 \geq \theta_1$.

Consider a situation where each of the wind turbine blades 1a, 1b, 1c can be moved at two positive, discrete pitch speeds, $k_1$ or $k_2$, where $k_2 > k_1$. If the pitch angles of the wind turbine blades 1a, 1b, 1c are different and need to be aligned, two strategies make sense.

According to a first strategy, the wind turbine blade having the pitch angle which is furthest away from the feathered position is moved towards the feathered position at the high speed, $k_2$, while the wind turbine blades having the pitch angle which is closest to the feathered position, and the intermediate pitch angle, are moved towards the feathered position at the low speed, $k_1$. Thus, in this case:

$$\dot\theta_1 = k_2, \dot\theta_2 = k_1, \dot\theta_3 = k_1.$$

In this case the wind turbine blade having the pitch angle which is furthest away from the feathered position is allowed to 'catch up' with the other two wind turbine blades.

According to a second strategy, the wind turbine blade having the pitch angle which is closest to the feathered position is moved towards the feathered position at the low speed, $k_1$, while the wind turbine blades having the pitch angle which is furthest away from the feathered position, and the intermediate pitch angle, are moved towards the feathered position at the high speed, $k_2$. Thus, in this case:

$$\dot{\theta}_1=k_2, \dot{\theta}_2=k_2, \dot{\theta}_3=k_1$$

In this case the wind turbine blades having the pitch angle which is furthest away from the feathered position and the intermediate pitch angle, are both allowed to 'catch up' with the wind turbine blade having the pitch angle which is closest to the feathered position.

In order to be able to select between these two strategies, it is investigated which strategy reduces the magnitude of the asymmetry vector fastest, i.e. which strategy results in the lowest value of the time derivative above.

For the first strategy, the time derivative, $\Delta_1$, is given by:

$$\Delta_1=2\theta_1 k_2+2\theta_2 k_1+2\theta_3 k_1-k_2\theta_2-\theta_1 k_1-k_2\theta_3-\theta_1 k_1-k_1\theta_3-\theta_2 k_1$$

$$\Delta_1=k_1(\theta_2+\theta_3-2\theta_1)+k_2(2\theta_1-\theta_2-\theta_3)$$

Similarly, for the second strategy, the time derivative, $\Delta_2$, is given by:

$$\Delta_2=2\theta_1 k_2+2\theta_2 k_2+2\theta_3 k_1-k_2\theta_2-\theta_1 k_2-k_2\theta_3-\theta_1 k_1-k_2\theta_3-\theta_2 k_1$$

$$\Delta_2=k_1(2\theta_3-\theta_2-\theta_1)+k_2(\theta_1+\theta_2-2\theta_3)$$

The criterion for selecting the first strategy is that $\Delta_1 < \Delta_2$. This is true when:

$$\Delta_1 < \Delta_2$$

$$k_1(\theta_2+\theta_3-2\theta_1)+k_2(2\theta_1-\theta_2-\theta_3) < k_1(2\theta_3-\theta_2-\theta_1)+k_2(\theta_1+\theta_2-2\theta_3)$$

$$k_1(2\theta_2-\theta_1-\theta_3) < k_2(2\theta_2-\theta_1-\theta_3)$$

Since $k_2 > k_1 > 0$, this inequality is true when the expression in the parentheses is greater than zero, i.e.:

$$2\theta_2-\theta_1-\theta_3 > 0$$

$$\theta_2 > (\theta_1+\theta_3)/2$$

Accordingly, the first strategy should be selected if $\theta_2 > (\theta_1+\theta_3)/2$, i.e. if the intermediate pitch angle is larger than the average of the pitch angle which is closest to the feathered position and the pitch angle which is furthest away from the feathered position.

Similarly, the second strategy should be selected if the $\theta_2 \le (\theta_1+\theta_3)/2$, i.e. if the intermediate pitch angle is smaller than or equal to the average of the pitch angle which is closest to the feathered position and the pitch angle which is furthest away from the feathered position.

Figure 2:
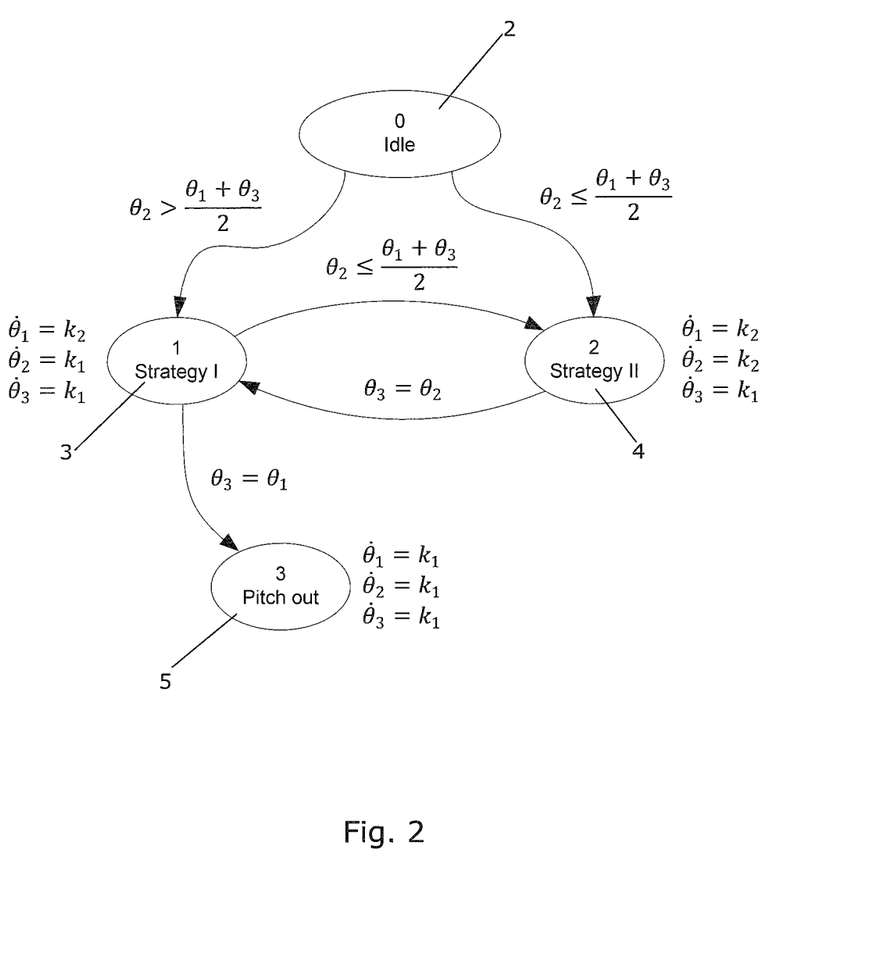
FIG. 2 shows a state machine representation of selection of shutdown strategies during shutdown of an individually pitched wind turbine, in accordance with a first embodiment of the invention.

FIG. 2 shows a state machine representation of selection of shutdown strategies during shutdown of an individually pitched wind turbine, in accordance with a first embodiment of the invention. The two shutdown strategies described above with reference to FIG. 1 are used.

At 2 a shutdown command is received, indicating that operation of the wind turbine is to be stopped. The pitch angles of the wind turbine blades are then determined, and the wind turbine blades are possibly renamed in the manner described above with reference to FIG. 1, in order to establish which wind turbine blade has the pitch angle which is closest to the feathered position, which wind turbine blade has the pitch angle which is furthest away from the feathered position, and which wind turbine blade has the intermediate pitch angle.

Then the intermediate pitch angle, $\theta_2$, is compared to the average of the two other pitch angles, $(\theta_1+\theta_3)/2$. If this comparison reveals that $\theta_2 > (\theta_1+\theta_3)/2$, then the first strategy is selected, at 3. On the other hand, if the comparison reveals that $\theta_2 \le (\theta_1+\theta_3)/2$, then the second strategy is selected, at 4.

Once an appropriate shutdown strategy has been selected, in order to reduce the pitch asymmetry as quickly as possible, the pitch angles of the three wind turbine blades are monitored. If the first strategy was initially selected, at 3, the intermediate pitch angle, $\theta_2$, is continuously compared to the average of the other two pitch angles, $(\theta_1+\theta_3)/2$. As soon as it is revealed that $\theta_2(\theta_1+\theta_3)/2$, a switch in strategy is performed from the first strategy to the second strategy, at 4. Thus, the speed of the wind turbine blade having the intermediate pitch angle is increased from $k_1$ to $k_2$.

If the second strategy was initially selected, at 4, or if a switch from the first strategy to the second strategy has been performed, the intermediate pitch angle, $\theta_2$, is compared to the pitch angle which is closest to the feathered position, $\theta_3$. When the intermediate pitch angle reaches the pitch angle which is closest to the feathered position, i.e. when $\theta_2=\theta_3$, a switch in strategy is performed from the second strategy to the first strategy, at 3. Thus, the speed of the wind turbine blade having the intermediate pitch angle is decreased from $k_2$ to $k_1$, and $\theta_2$ and $\theta_3$ have identical values for the remaining part of the shutdown process.

Following this, the pitch angle which is furthest away from the feathered position, $\theta_1$, is compared to the pitch angle which is closest to the feathered position, $\theta_3$. When the pitch angle which is furthest away from the feathered position reaches the pitch angle which is closest to the feathered position, i.e. when $\theta_3=\theta_1$, all three wind turbine blades have identical pitch angles, and the wind turbine blades are subsequently moved together towards the feathered position for the remaining part of the shutdown process, at 5. Thus, the speed of the last wind turbine blade is also reduced from $k_2$ to $k_1$.

Figure 3:
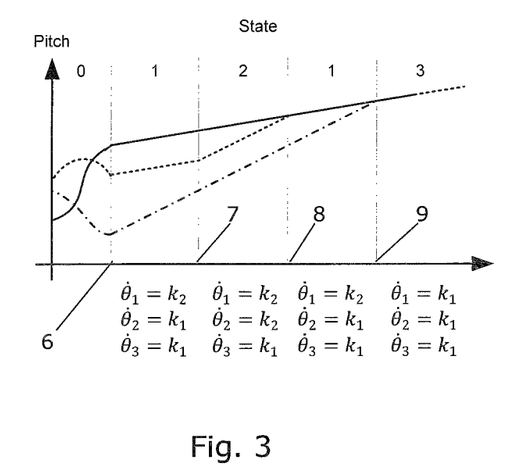
FIG. 3 is a graph illustrating a first shutdown process according to an embodiment of the invention.
Figure 4:
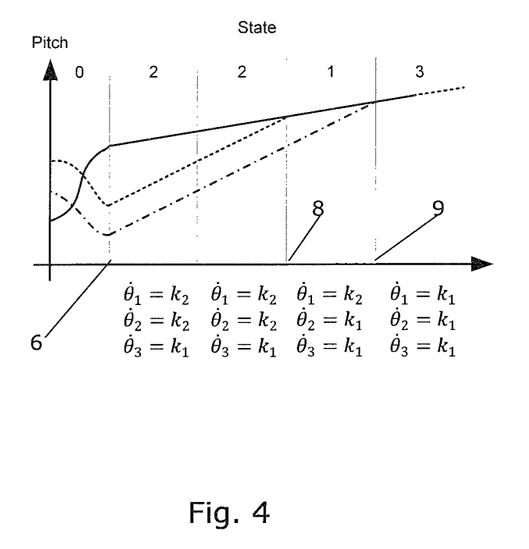
FIG. 4 is a graph illustrating a second shutdown process according to an embodiment of the invention.

FIGS. 3 and 4 illustrate two different shutdown sequences, switching between the first strategy and the second strategy as described above.

In FIG. 3, the pitch angles of the three wind turbine blades are shown as a function of time. The pitch angle which is closest to the feathered position, $\theta_3$, is represented by a solid line, the intermediate pitch angle, $\theta_2$, is represented by a dotted line, and the pitch angle which is furthest away from the feathered position, $\theta_1$, is represented by a dash-dotted line.

At time 6 a shutdown command is received. A comparison of the pitch angles reveals that the intermediate pitch angle is larger than the average of the other two pitch angles. Therefore the first strategy is selected, i.e. $\theta_2$ and $\theta_3$ are moved towards the feathered position at the low speed, $k_1$, while $\theta_1$ is moved towards the feathered position at the high speed, $k_2$.

This strategy is maintained until $\theta_1$ has been moved so close to the other two pitch angles, that the intermediate pitch angle, $\theta_2$, is equal to the average of the other two pitch angles. This occurs at time 7. Then a switch in strategy from the first strategy to the second strategy is performed, i.e. the speed of the wind turbine blade having the intermediate pitch angle, $\theta_2$, is increased from $k_1$ to $k_2$, i.e. this wind turbine blade is subsequently moved towards the feathered position at the same speed as the wind turbine blade having the pitch angle which is furthest away from the feathered position.

This strategy is maintained until the intermediate pitch angle, $\theta_2$, reaches the pitch angle which is closest to the feathered position, $\theta_3$, i.e. until $\theta_2=\theta_3$. This occurs at time 8. Then a switch in strategy from the second strategy to the first strategy is performed, i.e. the speed of the wind turbine blade having the intermediate pitch angle, $\theta_2$, is once again reduced from $k_2$ to $k_1$, and $\theta_2$ remains equal to $\theta_3$ for the remaining part of the shutdown process.

Finally, when the pitch angle which is furthest away from the feathered position, $\theta_1$, also reaches the pitch angle which is closest to the feathered position, $\theta_3$, i.e. when $\theta_3=\theta_1$, the speed of the last wind turbine blade is also reduced from $k_2$ to $k_1$. This occurs at time 9. Accordingly, at this point in time all three wind turbine blades have been aligned, and are subsequently moved together towards the feathered position at the low speed, $k_1$.

In the situation shown in FIG. 4, a shutdown command is also received at time 6. However, in this case the intermediate pitch angle is smaller than the average of the other two pitch angles. Therefore the second strategy is selected, i.e. $\theta_1$ and $\theta_2$ are moved towards the feathered position at the high speed, $k_2$, while $\theta_3$ is moved towards the feathered position the low speed, $k_1$.

When the intermediate pitch angle, $\theta_2$, reaches the pitch angle which is closest to the feathered position, $\theta_3$, i.e. when $\theta_3=\theta_2$, the speed of $\theta_2$ is reduced from $k_2$ to $k_1$, as described above. This occurs at time 8. Furthermore, when the pitch angle which is furthest away from the feathered position, $\theta_1$, reaches the pitch angle which is closest to the feathered position, $\theta_3$, i.e. when $\theta_3=\theta_1$, the speed of $\theta_1$ is also reduced from $k_2$ to $k_1$, as described above. This occurs at time 9.

Figure 5:
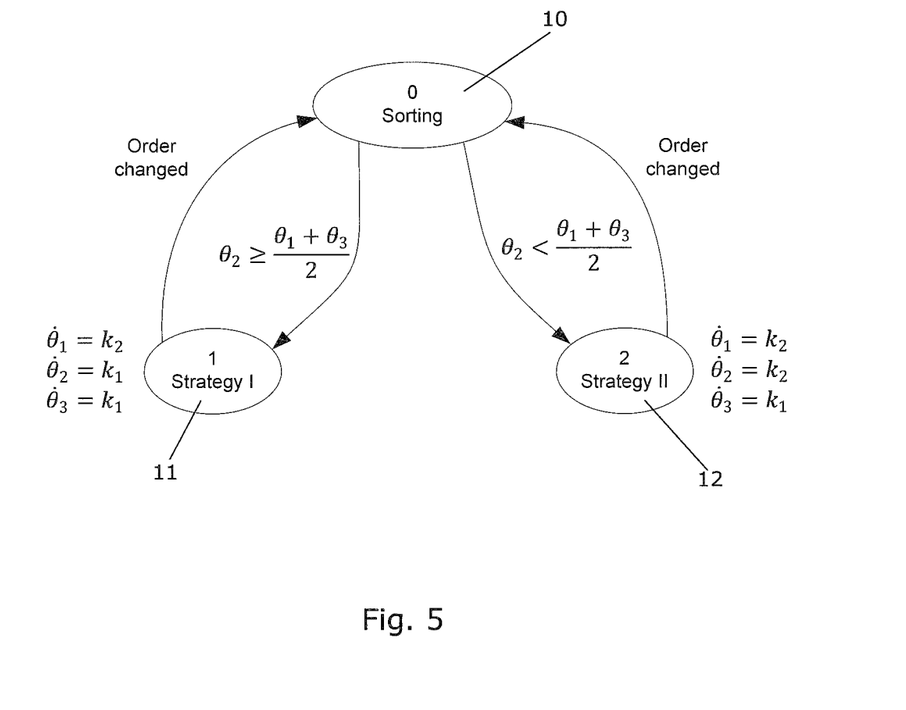
FIG. 5 shows a state machine representation of a selection of shutdown strategies during shutdown of an individually pitched wind turbine, in accordance with a second embodiment of the invention.

FIG. 5 shows a state machine representation of selection of shutdown strategies during shutdown of an individually pitched wind turbine, in accordance with a second embodiment of the invention. The two shutdown strategies described above with reference to FIG. 1 are used.

At 10 a shutdown command is received, indicating that operation of the wind turbine is to be stopped. The pitch angles of the wind turbine blades are then determined, and the wind turbine blades are sorted according to the pitch angles. This may include renaming the wind turbine blades in the manner described above with reference to FIGS. 1 and 2.

Then the intermediate pitch angle, $\theta_2$, is compared to the average of the two other pitch angles, $(\theta_1+\theta_3)/2$. If this comparison reveals that $\theta_2>(\theta_1+\theta_3)/2$, then the first strategy is selected, at 11. On the other hand, if the comparison reveals that $\theta_2\leq(\theta_1+\theta_3)/2$, then the second strategy is selected, at 12.

Once an appropriate shutdown strategy has been selected, in order to reduce the pitch asymmetry as quickly as possible, the pitch angles of the three wind turbine blades are monitored. If one of the wind turbine blades 'catches up' with one of the other wind turbine blades, the order of the wind turbine blades will change. For instance, if the wind turbine blade having the pitch angle which is furthest away from the feathered position 'catches up' with the intermediate wind turbine blade, then the wind turbine blade having the pitch angle which is furthest away from the feathered position becomes the intermediate wind turbine blade, and vice versa. In this case the initially selected strategy may no longer be appropriate. Therefore, when it is detected that one of the wind turbine blades has 'caught up' with one of the other wind turbine blades, and the order of the blades has therefore changed as described above, the process is returned to 10, where the pitch angles of the wind turbine blades are once again determined and compared, and the wind turbine blades are renamed.

Then the intermediate pitch angle, $\theta_2$, is compared to the average of the two other wind turbine blade, $(\theta_1+\theta_3)/2$, and a new shutdown strategy is selected on the basis of this comparison in the manner described above.

Figure 6:
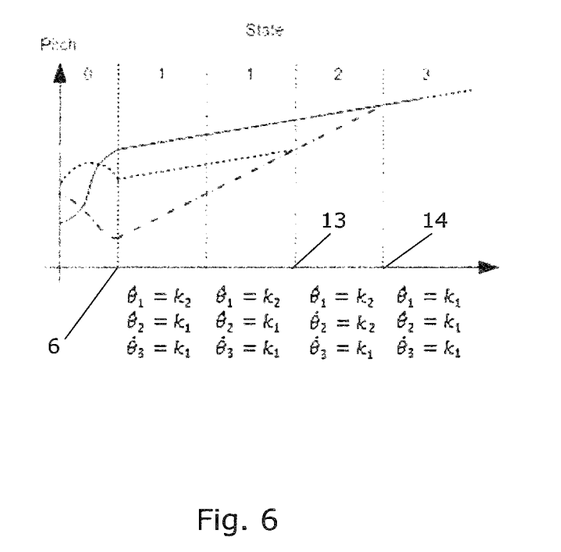
FIG. 6 is a graph illustrating a third shutdown process according to an embodiment of the invention.
Figure 7:
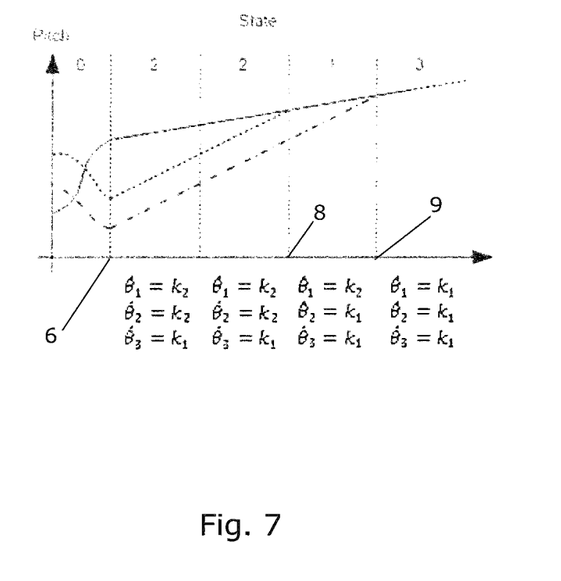
FIG. 7 is a graph illustrating a fourth shutdown process according to an embodiment of the invention.

FIGS. 6 and 7 illustrate two different shutdown sequences, switching between the first strategy and the second strategy as described above with reference to FIG. 5. FIGS. 6 and 7 are similar to FIGS. 3 and 4.

In FIG. 6, the pitch angles of the three wind turbine blades are shown as a function of time. The pitch angle which is closest to the feathered position, $\theta_3$, is represented by a solid line, the intermediate pitch angle, $\theta_2$, is represented by a dotted line, and the pitch angle which is furthest away from the feathered position, $\theta_1$, is represented by a dash-dotted line.

At time 6 a shutdown command is received. A comparison of the pitch angles reveals that the intermediate pitch angle is larger than the average of the other two pitch angles. Therefore the first shutdown strategy is selected, i.e. $\theta_2$ and $\theta_3$ are moved towards the feathered position at the low speed, $k_1$, while $\theta_1$ is moved towards the feathered position at the high speed, $k_2$.

This strategy is maintained until $\theta_1$ has 'caught up' with $\theta_2$, i.e. until $\theta_1=\theta_2$, at time 13. Then a switch in strategy from the first strategy to the second strategy is performed, i.e. the speed of the wind turbine blade having the intermediate pitch angle, $\theta_2$, is increased from $k_1$ to $k_2$, i.e. this wind turbine blade is subsequently moved towards the feathered position at the same speed as the wind turbine blade which initially had the pitch angle being furthest away from the feathered position, i.e. these two wind turbine blades are moved together in the sense that their pitch angles remain identical.

This strategy is maintained until these two pitch angles reach the pitch angle which is closest to the feathered position, $\theta_3$, i.e. until $\theta_1=\theta_2=\theta_3$. This occurs at time 14. Accordingly, at this point in time all three wind turbine blades have been aligned, and are subsequently moved together towards the feathered position at the low speed, $k_1$.

The situation shown in FIG. 7 is identical to the situation shown in FIG. 4, and it will therefore not be described here.

Thus, FIGS. 6 and 7 illustrate that when a shutdown command is received, a shutdown strategy is selected on the basis of the asymmetry of the pitch angles of the wind turbine blades. The selected strategy is maintained until one of the wind turbine blades 'catches up' with one of the other wind turbine blades, i.e. until the pitch angles of two of the wind turbine blades have become aligned. When this occurs, the choice of shutdown strategy is reconsidered, and a switch in control strategy is performed if appropriate.

The invention claimed is:

1. A method for controlling an individually pitched wind turbine during shutdown, said wind turbine comprising at least three wind turbine blades, the method comprising:
   receiving a shutdown command for stopping operation of the wind turbine;
   determining a blade parameter of each of the wind turbine blades;
   comparing the blade parameters of the wind turbine blades;
   selecting a shutdown strategy for the wind turbine from a group of two or more predefined shutdown strategies, based on the comparing;

moving the wind turbine blades towards a feathered position in accordance with the selected shutdown strategy;

monitoring the blade parameters of the wind turbine blades during shutdown;

selecting a new shutdown strategy from the group of two or more shutdown strategies in the case that one or more predefined criteria is/are fulfilled; and continuing movement of the wind turbine blades towards the feathered position in accordance with the new shutdown strategy.

2. A method according to claim 1, wherein the blade parameters are pitch angles of the wind turbine blades.

3. A method according to claim 2, wherein comparing the pitch angles comprises identifying a first wind turbine blade, a second wind turbine blade and a third wind turbine blade, wherein the first wind turbine blade is the wind turbine blade having a pitch angle which is furthest away from a feathered position, the third wind turbine blade is the wind turbine blade having a pitch angle which is closest to a feathered position, and the second wind turbine blade has an intermediate pitch angle.

4. A method according to claim 3, wherein a first shutdown strategy comprises moving the second wind turbine blade and the third wind turbine blade at a first speed, $k_1$, and moving the first wind turbine blade at a second speed, $k_2$, wherein $k_1<k_2$.

5. A method according to claim 3, wherein a second shutdown strategy comprises moving the third wind turbine blade at a first speed, $k_1$, and moving the first wind turbine blade and the second wind turbine blade at a second speed, $k_2$, wherein $k_1<k_2$.

6. A method according to claim 4, further comprising:
monitoring the pitch angles of the wind turbine blades during shutdown, and
switching from the first shutdown strategy to the second shutdown strategy in the case that $\theta_1$ becomes equal to $\theta_2$.

7. A method according to claim 1, where the one or more criteria comprises the blade parameter of one of the wind turbine blades becoming equal to the blade parameter of one of the other wind turbine blades.

8. A method according to claim 1, wherein selecting a shutdown strategy comprises selecting the shutdown strategy which results in the lowest asymmetry of blade loads on the wind turbine blades while moving the wind turbine blades towards the feathered position.

9. A method according to claim 3, wherein comparing the pitch angles further comprises comparing the pitch angle, $\theta_2$, of the second wind turbine blade with an average of the pitch angle, $\theta_1$, of the first wind turbine blade and the pitch angle, $\theta_3$, of the third wind turbine blade, and wherein the step of selecting a shutdown strategy comprises selecting a first shutdown strategy in the case that $\theta_2$ is larger than the average of $\theta_1$ and $\theta_3$, and selecting a second shutdown strategy in the case that $\theta_2$ is smaller than or equal to the average of $\theta_1$ and $\theta_3$.

10. A method according to claim 9, further comprising:
monitoring the pitch angles of the wind turbine blades during shutdown, and switching from the first shutdown strategy to the second shutdown strategy in the case that $\theta_2$ becomes smaller than or equal to the average of $\theta_1$ and $\theta_3$.

11. A method according to claim 10, further comprising switching from the second shutdown strategy back to the first shutdown strategy in the case that $\theta_2$ exceeds the average of $\theta_1$ and $\theta_3$ by a predefined amount, or in the case that $\theta_2$ becomes larger than the average of $\theta_1$ and $\theta_3$, and a predetermined time has elapsed since the switch from the first shutdown strategy to the second shutdown strategy was performed.

12. A method according to claim 9, further comprising:
monitoring the pitch angles of the wind turbine blades during shutdown, and
switching from the second shutdown strategy to the first shutdown strategy in the case that $\theta_3$ becomes equal to $\theta_2$.

13. A method for controlling an individually pitched wind turbine during shutdown, said wind turbine comprising at least three wind turbine blades, the method comprising:
receiving a shutdown command for stopping operation of the wind turbine,
determining a blade parameter of each of the wind turbine blades, wherein the blade parameters are pitch angles of the wind turbine blades
comparing the blade parameters of the wind turbine blades,
selecting a shutdown strategy for the wind turbine from a group of two or more predefined shutdown strategies, based on the comparing, and
moving the wind turbine blades towards a feathered position in accordance with the selected shutdown strategy,
wherein comparing the pitch angles comprises identifying a first wind turbine blade, a second wind turbine blade and a third wind turbine blade, wherein the first wind turbine blade is the wind turbine blade having a pitch angle which is furthest away from a feathered position, the third wind turbine blade is the wind turbine blade having a pitch angle which is closest to a feathered position, and the second wind turbine blade has an intermediate pitch angle, and
wherein comparing the pitch angles further comprises comparing the pitch angle, $\theta_2$, of the second wind turbine blade with an average of the pitch angle, $\theta_1$, of the first wind turbine blade and the pitch angle, $\theta_3$, of the third wind turbine blade, and wherein the step of selecting a shutdown strategy comprises selecting a first shutdown strategy in the case that $\theta_2$ is larger than the average of $\theta_1$ and $\theta_3$, and selecting a second shutdown strategy in the case that $\theta_2$ is smaller than or equal to the average of $\theta_1$ and $\theta_3$.

14. A method according to claim 13, further comprising:
monitoring the pitch angles of the wind turbine blades during shutdown, and
switching from the first shutdown strategy to the second shutdown strategy in the case that $\theta_2$ becomes smaller than or equal to the average of $\theta_1$ and $\theta_3$.

15. A method according to claim 14, further comprising switching from the second shutdown strategy back to the first shutdown strategy in the case that $\theta_2$ exceeds the average of $\theta_1$ and $\theta_3$ by a predefined amount, or in the case that $\theta_2$ becomes larger than the average of $\theta_1$ and $\theta_3$, and a predetermined time has elapsed since the switch from the first shutdown strategy to the second shutdown strategy was performed.

16. A method according to claim 13, further comprising:
monitoring the pitch angles of the wind turbine blades during shutdown, and
switching from the second shutdown strategy to the first shutdown strategy in the case that $\theta_3$ becomes equal to $\theta_2$.

17. A control unit for controlling pitch angles of an individually pitched wind turbine, the wind turbine comprising at least three wind turbine blades, the control unit comprising an input adapted to receive a shutdown command for stopping operation of the wind turbine; the control unit further comprising a processor configured to perform an operation comprising:
- determining a blade parameter of each of the wind turbine blades;
- comparing the blade parameters of the wind turbine blades;
- selecting a shutdown strategy for the wind turbine from a group of two or more predefined shutdown strategies, based on the comparing; and
- moving the wind turbine blades towards a feathered position in accordance with the selected shutdown strategy;
- monitoring the blade parameters of the wind turbine blades during shutdown;
- selecting a new shutdown strategy from the group of two or more shutdown strategies in the case that one or more predefined criteria is/are fulfilled; and
- continuing movement of the wind turbine blades towards the feathered position in accordance with the new shutdown strategy.

18. An individually pitched wind turbine comprising:
a tower;
a nacelle disposed on the tower;
a rotor extending from the nacelle, and having a hub disposed on a distal end;
at least three wind turbine blades coupled to the hub; and
a control unit comprising an input adapted to receive a shutdown command for stopping operation of the wind turbine; the control unit further comprising a processor configured to perform an operation comprising:
- determining a blade parameter of each of the wind turbine blades;
- comparing the blade parameters of the wind turbine blades;
- selecting a shutdown strategy for the wind turbine from a group of two or more predefined shutdown strategies, based on the comparing;
- moving the wind turbine blades towards a feathered position in accordance with the selected shutdown strategy;
- monitoring the blade parameters of the wind turbine blades during shutdown;
- selecting a new shutdown strategy from the group of two or more shutdown strategies in the case that one or more predefined criteria is/are fulfilled; and
- continuing movement of the wind turbine blades towards the feathered position in accordance with the new shutdown strategy.

* * * * *